(12) United States Patent
Mang et al.

(10) Patent No.: US 11,389,884 B2
(45) Date of Patent: Jul. 19, 2022

(54) HANDHELD PORTABLE CUTTING APPARATUS HAVING A CUTTER UNIT

(71) Applicant: Andreas Stihl AG & Co. KG, Waiblingen (DE)

(72) Inventors: Harald Mang, Winnenden (DE); Alexander Trenn, Frickenhausen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 42 days.

(21) Appl. No.: 15/812,419

(22) Filed: Nov. 14, 2017

(65) Prior Publication Data

US 2018/0133818 A1 May 17, 2018

(30) Foreign Application Priority Data

Nov. 14, 2016 (DE) .......................... 102016013910.2

(51) Int. Cl.
| | |
|---|---|
| *B23D 53/12* | (2006.01) |
| *B27B 17/08* | (2006.01) |
| *B23D 57/02* | (2006.01) |
| *B27B 17/02* | (2006.01) |
| *B27B 17/00* | (2006.01) |

(52) U.S. Cl.
CPC ........... *B23D 53/12* (2013.01); *B23D 57/023* (2013.01); *B27B 17/0008* (2013.01); *B27B 17/02* (2013.01); *B27B 17/08* (2013.01)

(58) Field of Classification Search
CPC .. B23D 53/12; B23D 57/023; B27B 17/0008; B27B 17/02; B27B 17/08
See application file for complete search history.

(56) References Cited

U.S. PATENT DOCUMENTS

| | | | |
|---|---|---|---|
| 2,990,858 A | 7/1961 | Ledger | |
| 3,530,909 A * | 9/1970 | Scharpf | ............... B27B 17/0033 30/381 |
| 4,819,335 A | 4/1989 | Alexander | |

(Continued)

FOREIGN PATENT DOCUMENTS

| | | |
|---|---|---|
| CN | 103299835 A | 9/2013 |
| GB | 2506016 A | 3/2014 |

(Continued)

OTHER PUBLICATIONS

English translation and Chinese Office action dated Nov. 9, 2020 of corresponding Chinese application 201711121583.3.

*Primary Examiner* — Evan H MacFarlane
*Assistant Examiner* — Liang Dong
(74) *Attorney, Agent, or Firm* — Walter Ottesen, P.A.

(57) ABSTRACT

A handheld portable cutting apparatus has a cutter unit with a cutter unit longitudinal axis. In a central housing section of the cutting apparatus, a drive connection is arranged between an electric drive motor and the cutter unit, wherein a motor housing having a motor housing longitudinal axis extends from the central housing section. A handle extends from the central housing section in a handle longitudinal axis. The cutter unit includes a guide bar with a saw chain circulating thereon, wherein, in a side view onto the cutting apparatus, the point of intersection between the handle longitudinal axis and the motor housing longitudinal axis and also the point of intersection between the handle longitudinal axis and the cutter unit longitudinal axis lie in the central housing section.

20 Claims, 6 Drawing Sheets

(56) References Cited

U.S. PATENT DOCUMENTS

| | | | |
|---|---|---|---|
| 9,636,840 B2* | 5/2017 | Saitoh | F16H 7/06 |
| 9,815,220 B2* | 11/2017 | Madson | B27B 17/08 |
| 2007/0215138 A1* | 9/2007 | Vanderzanden | B23D 57/023 |
| | | | 125/21 |
| 2008/0256805 A1* | 10/2008 | Maddison | B27B 17/0008 |
| | | | 30/295 |
| 2008/0295342 A1* | 12/2008 | Stones | B27B 17/0083 |
| | | | 30/264 |
| 2010/0162579 A1 | 7/2010 | Naughton et al. | |
| 2010/0314146 A1* | 12/2010 | Kondo | B27B 17/00 |
| | | | 173/171 |
| 2011/0005088 A1* | 1/2011 | Pellenc | B27B 17/12 |
| | | | 30/383 |
| 2013/0219725 A1 | 8/2013 | Winkel et al. | |
| 2017/0239835 A1* | 8/2017 | Ebner | B27B 17/02 |

FOREIGN PATENT DOCUMENTS

| | | | |
|---|---|---|---|
| KR | 10-2013-0101732 A | | 9/2013 |
| KR | 101365342 B1 * | | 2/2014 |
| WO | 2006082062 A1 | | 8/2006 |
| WO | 2007147157 A2 | | 12/2007 |

* cited by examiner

HANDHELD PORTABLE CUTTING APPARATUS HAVING A CUTTER UNIT

CROSS REFERENCE TO RELATED APPLICATION

This application claims priority of German patent application no. 10 2016 013 910.2, filed Nov. 14, 2016, the entire content of which is incorporated herein by reference.

FIELD OF THE INVENTION

The invention relates to a handheld portable cutting apparatus having a cutter unit, which adjoins a central housing section of the cutting apparatus. In the central housing section of the cutting apparatus, a drive connection is arranged between an electric drive motor and the cutter unit. The drive motor is accommodated in a motor housing, which extends from the central housing section and has a motor housing longitudinal axis. To hold and guide the cutting apparatus, provision is made of a handle, which extends from the central housing section and has a handle longitudinal axis. In the handle longitudinal direction, the handle has a front end, adjoining the central housing section, and a free rear end.

BACKGROUND OF THE INVENTION

In the case of such a cutting apparatus having a cutter unit, an ergonomically adapted configuration is necessary for long-term use.

SUMMARY OF THE INVENTION

It is an object of the invention to provide a cutting apparatus configured such that fatigue-proof, ergonomic guidance of the cutting apparatus by the user is ensured.

The object can, for example, be achieved in that the cutter unit has a guide bar and a saw chain circulating thereon, and the drive motor drives the saw chain via the drive connection. In a side view onto the cutting apparatus, the point of intersection between the handle longitudinal axis and the motor housing longitudinal axis and also the point of intersection between the handle longitudinal axis and the cutter unit longitudinal axis lie in the central housing section.

As a powerful cutter unit, provision is a made of a saw chain circulating on a guide bar, wherein the electric drive motor drives the saw chain via the drive connection. The cutting apparatus is configured here in such a way that, in a side view onto the cutting apparatus, the point of intersection between the handle longitudinal axis and the motor housing longitudinal axis and also the point of intersection between the handle longitudinal axis and a cutter unit longitudinal axis lie in the region of the central housing section.

This configuration and arrangement of the various elements of a cutting apparatus around a central housing section results in an ergonomically advantageous housing configuration, which makes fatigue-proof working with the cutting apparatus possible.

In an embodiment of the invention, the cutter unit, the motor housing and the handle extend in radial directions away from the central housing section. In this case, the cutter unit, the motor housing and the handle are located spaced apart in the circumferential direction about the central housing section.

The arrangement is advantageously made in such a way that, in an end view onto the rotational axis of a rotating driving wheel of the drive connection, the points of intersection between the handle longitudinal axis and the motor housing longitudinal axis, between the cutter unit longitudinal axis and the handle longitudinal axis, and between the cutter unit longitudinal axis and the motor housing longitudinal axis lie within the contour of the driving wheel. The arrangement is advantageously made here in such a way that, in a side view onto the cutting apparatus, the cutter unit, the motor housing and the handle extend radially to the rotational axis of the driving wheel.

A sprocket wheel driving the saw chain of the cutter unit advantageously lies within the contour of the driving wheel and is covered by a sprocket wheel cover. The sprocket wheel cover is expediently part of the central housing section.

The handle longitudinal axis and the motor housing longitudinal axis include a directional angle which opens to the rear end of the handle. This directional angle has a magnitude in the range of from 40° to 80°, in particular a magnitude of 60°. Through the configuration of the directional angle, a protected receptacle for a user's hand gripping around the handle is formed between the motor housing and the handle.

The configuration of a directional angle, with the formation of a receptacle, furthermore has the advantage that the user can apply, for example, via the back of the user's hand, an advancing force to the cutter unit, in the embodiment to the saw chain of the cutter unit.

In the circumferential direction, on the opposing side of the handle, a handle angle measuring in particular greater than 90° is formed between the handle longitudinal axis of the handle and the cutter unit longitudinal axis. The handle angle is preferably 150°.

In an embodiment of the invention, the handle angle is divided by a finger guard. In this case, the finger guard, together with the handle longitudinal axis, can delimit a finger angle of 80° to 110° which opens to the rear end of the handle. The finger angle is advantageously 90°.

An apparatus angle lying between the motor housing longitudinal axis and the cutter unit longitudinal axis is such that it is greater than 90°. The apparatus angle can, in particular, be 150°.

In an embodiment of the invention, it is provided that the sum total of directional angle and apparatus angle is regularly greater than 180°.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
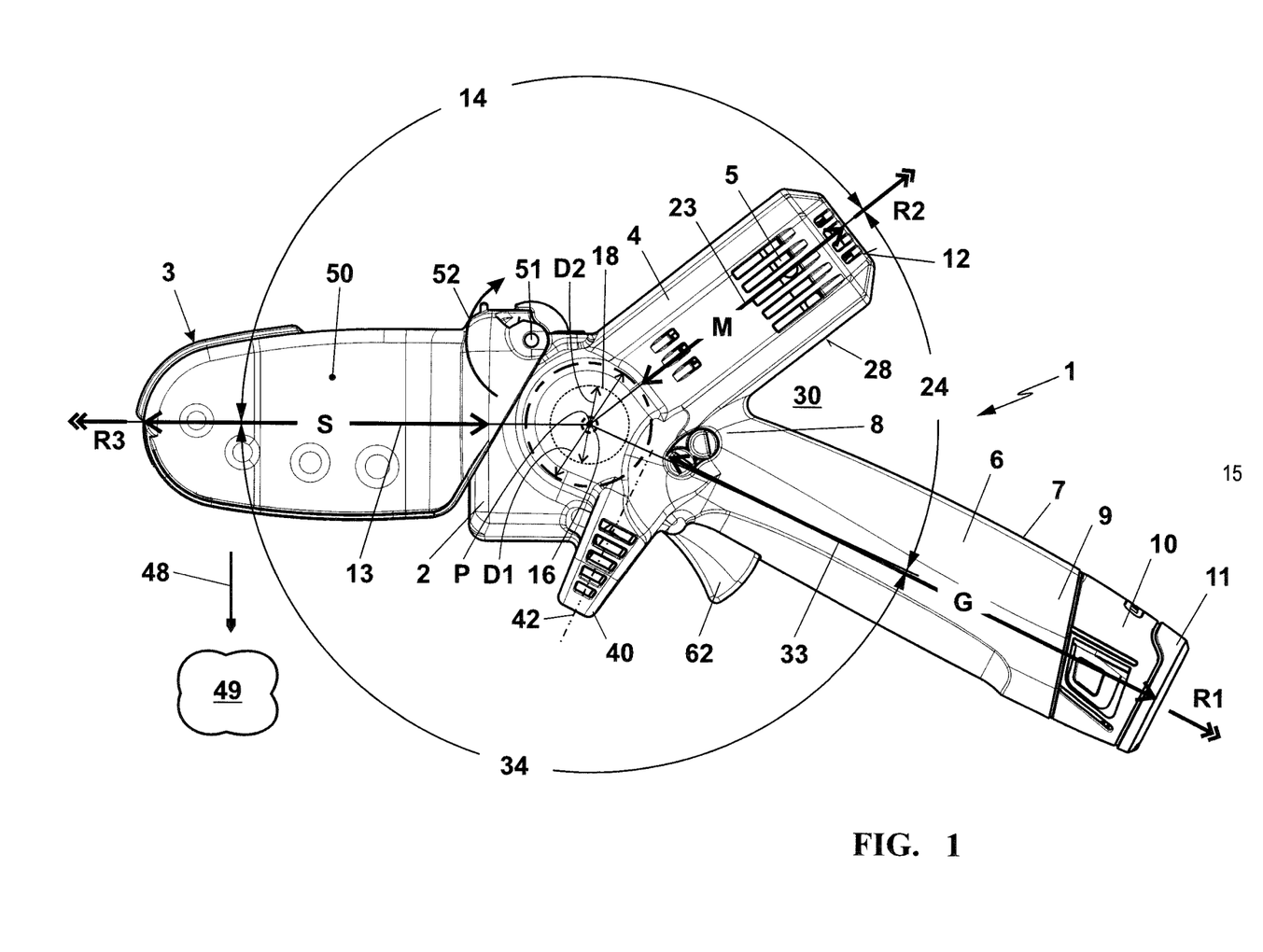
FIG. 1 shows, in a first side view, a handheld portable cutting apparatus.

The handheld cutting apparatus 1 shown in a side view in FIG. 1 is expediently formed as what is termed a wood cutter. The cutting apparatus 1 includes a central housing section 2, on which a cutter unit 3, a motor housing 4 with an electric drive motor 5, and also a handle 6 are arranged.

The handle 6 is formed by a rod-shaped handle housing 7, which is connected by way of a front end 8 to the central housing section 2. The rear end 9 of the handle housing 7 has an open form. A battery pack 10 is pushed into the open rear end 9 and protrudes out of the handle housing 7 by way of an end section 11. The end section 11 is configured as an elongated end of the handle housing 7. The rod-shaped handle 6 has a handle length G, measured from the front end 8 of the handle housing 7 as far as the rear end of the end section 11 of the battery pack 10. The rear handle 6 extends radially from the central housing section 2 in a first radial direction R1.

The motor housing 4 with the electric drive motor 5 extends radially from the central housing section 2 in a second radial direction R2. Measured from the central housing section 2 as far as the free end 12 of the motor housing 4, the motor housing 4 has a length M.

The cutter unit 3 extends over a length S radially from the central housing section 2 in a third radial direction R3; the length S of the cutter unit 3 is greater than the length M of the motor housing 4 and smaller than the handle length G.

In the normal position of the cutter unit 3, as shown in FIG. 1, a cutter unit longitudinal axis 13 lies approximately horizontally. The radial direction R3 thus lies horizontally.

In a clockwise direction, the radial direction R2 of the motor housing 4 lies rotated by a peripheral angle 14. Furthermore, in a clockwise direction, a peripheral angle 24 of 65° lies between the radial direction R2 and the radial direction R1 of the handle 6.

The radial direction R3 of the cutter unit longitudinal axis 13 is rotated by a peripheral angle 34 of 155° in a clockwise direction with respect to the radial direction R1 of the handle longitudinal axis 33.

A drive connection 15 is accommodated in the central housing section 2 and is arranged between the electric drive motor 5 and the cutter unit 3. The drive connection 15 has a driving wheel 17 rotating about a rotational axis 16.

Figure 2:
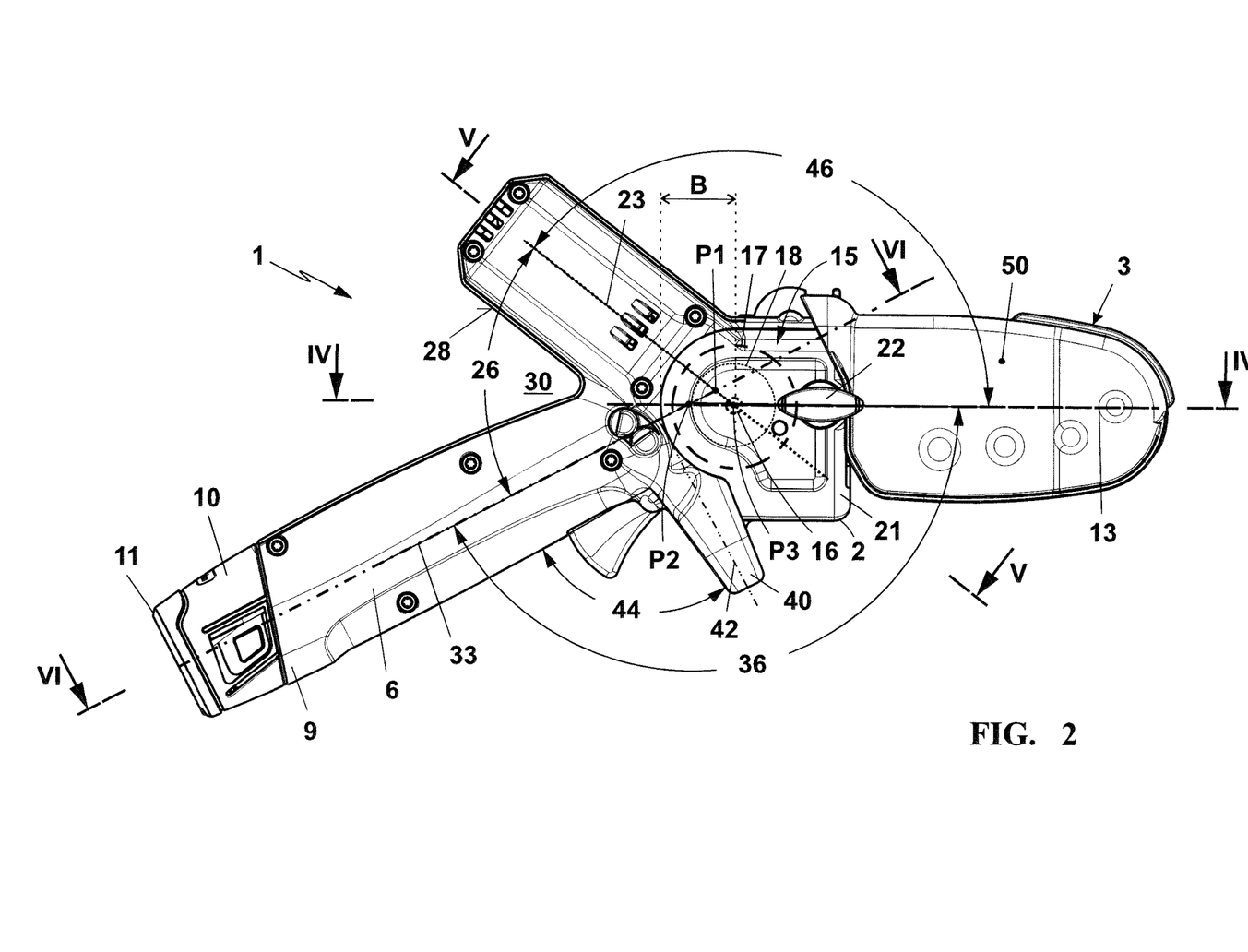
FIG. 2 shows, in a second side view, the handheld portable cutting apparatus shown in FIG. 1.
Figure 4:
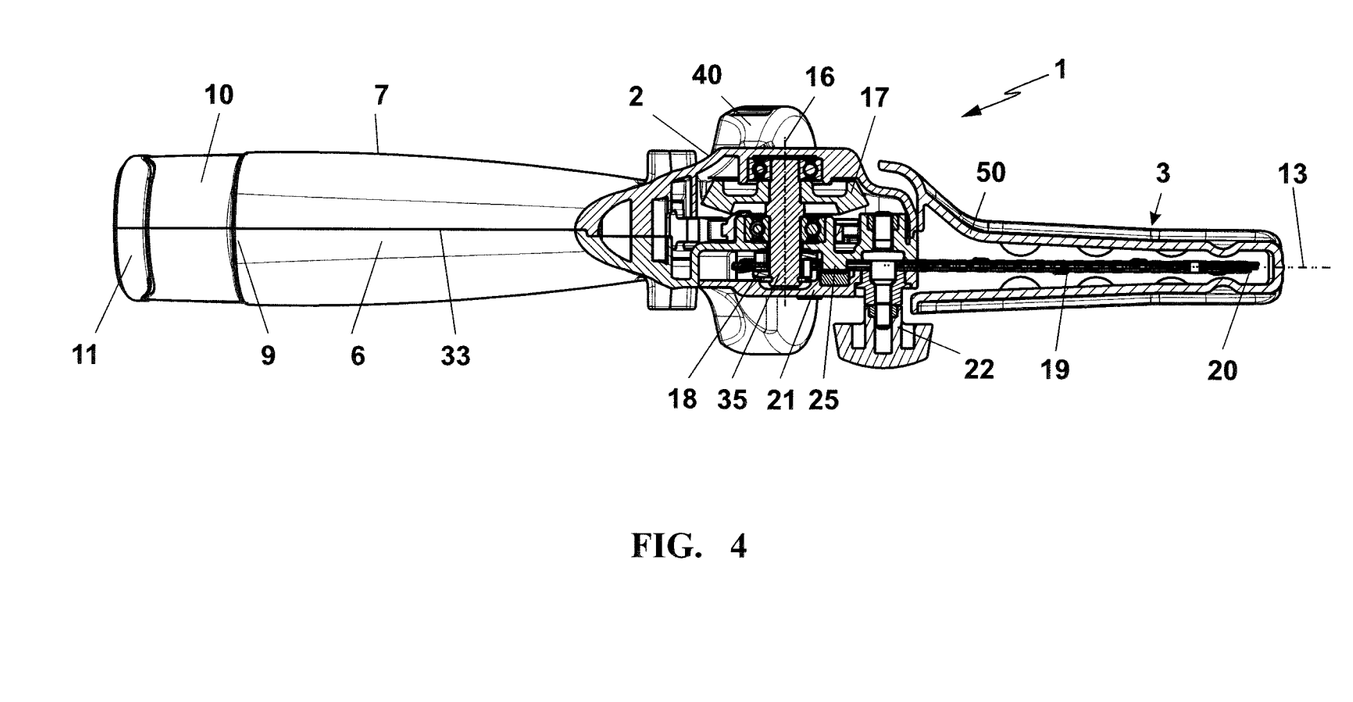
FIG. 4 shows a schematic section through the cutting apparatus along the line IV-IV shown in FIG. 2.
Figure 5:
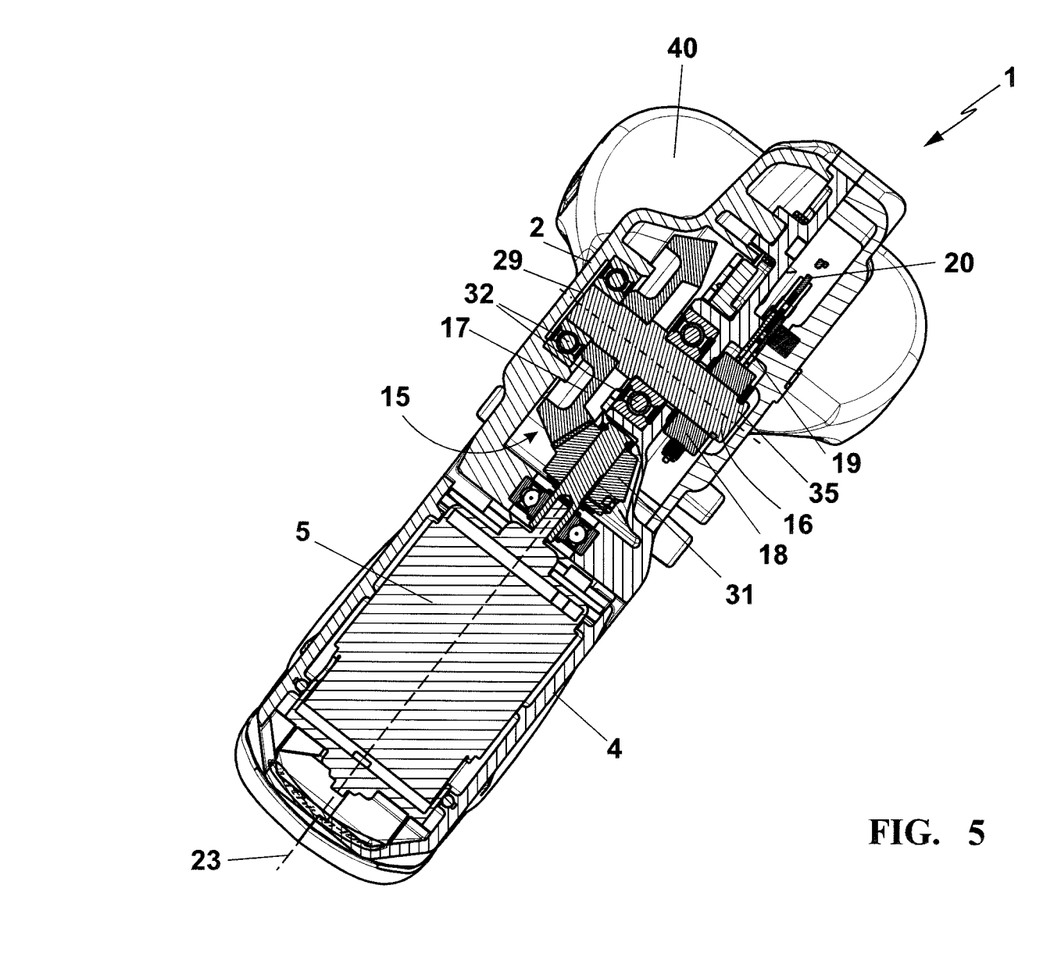
FIG. 5 shows a schematic section through the cutting apparatus along the line V-V shown in FIG. 2; and, FIG. 6 shows a schematic section through the cutting apparatus along the line VI-VI shown in FIG. 2.

As FIGS. 4 and 5 show, in the embodiment shown, the driving wheel 17 is held fixedly in terms of rotation on a drive shaft 29, at one end of which there is arranged a sprocket wheel 18. As FIGS. 4 to 6 in particular show, the cutter unit 3 includes a guide bar 19 (FIG. 4) and a saw chain 20 circulating thereon. In a side view onto the cutting apparatus 1, for example, in the side view as shown in FIG. 2, a handle longitudinal axis 33 and the motor housing longitudinal axis 23 have a point of intersection P1, which in side view—cf. FIGS. 1 and 2—lies in the central housing section 2. The point of intersection P2 between the handle longitudinal axis 33 and the cutter unit longitudinal axis 13 likewise lies in the central housing section 2, in a side view onto the cutting apparatus 1.

As FIG. 2 furthermore shows, a point of intersection P3 between the cutter unit longitudinal axis 13 and the motor housing longitudinal axis 23 lies in the central housing section 2, in particular on the rotational axis 16 of the driving wheel 17.

In an embodiment, the points of intersection P1, P2 and P3 of the cutter unit longitudinal axis 13, the motor housing longitudinal axis 23 and the handle longitudinal axis 33 lie in a region B of the central housing section 2 which—as FIG. 2 shows—extends between the rotational axis 16 and the front end 8 of the handle 6.

In an embodiment of the invention, the points of intersection P1, P2 and P3 of the cutter unit longitudinal axis 13, the motor housing longitudinal axis 23 and the handle longitudinal axis 33 lie, in a side view, within the contour of the driving wheel 16, as FIG. 2 shows. The cutter unit 3, the motor housing 4 and the handle 6 preferably extend radially to the rotational axis 16 of the driving wheel (FIG. 1).

As shown in FIG. 1, it may be advantageous if the points of intersection between the cutter unit longitudinal axis 13, the motor housing longitudinal axis 23 and the handle longitudinal axis 33 form a common point of intersection P. In particular, the common point of intersection P can lie on the rotational axis 16 of the driving wheel 17.

The sprocket wheel 18 has a diameter D2 which is smaller than the diameter D1 of the driving wheel 17 meshing with the drive pinion 31 of the drive motor 5. In a side view according to FIGS. 1 and 2, the sprocket wheel 18 lies within the contour of the driving wheel 17. As FIG. 1 shows, it is advantageous if the points of intersection between the cutter unit longitudinal axis 13, the motor housing longitudinal axis 23 and the handle longitudinal axis 33 lie within the contour of the sprocket wheel 18. In FIG. 1, the common point of intersection P lies within the contour of the driving wheel 17 and also within the contour of the sprocket wheel 18. In this case, individual points of intersection P1 and P3 can lie within the contour of the sprocket wheel 18 (FIG. 2) or else in the marginal region of the contour of the sprocket wheel 18, as FIG. 2 shows.

The sprocket wheel 18 is covered by a sprocket wheel cover 21, which is fastened to the central housing section 2 by means of a stud bolt 22. The guide bar 19 of the cutter unit 3 is held clamped between the sprocket wheel cover 21 and a counter bearing 25 of the central housing section 2. The sprocket wheel cover 21 forms part of the central housing section 2.

As FIG. 2 shows, the handle longitudinal axis 33 and the motor housing longitudinal axis 23 include a directional angle 26 open to the rear end 9. The directional angle 26 advantageously lies in a range of from 40° to 80°. The directional angle 26 present between the handle longitudinal axis 33 of the handle 6 and the motor housing longitudinal axis 23 expediently has a magnitude of 60°.

Through the directional angle 26, a protected receptacle 30 for a user's hand surrounding the handle 6 is formed between the motor housing 4 and the handle 6. The directional angle 26 is advantageously such that a user's hand gripping around the handle 6 can be brought to bear against a bearing surface 28 of the motor housing 4, in order to introduce an advancing force into the cutting apparatus 1.

With respect to the rotational axis 16 of the driving wheel 17, or of the sprocket wheel 18, in the circumferential direction, on the opposing side of the handle 6, a handle angle 36 advantageously greater than 90° lies between the handle longitudinal axis 33 and the cutter unit longitudinal axis 13. The handle angle 36 is in particular 150°.

As shown in FIGS. 1 and 2, the handle angle 36 is divided by a finger guard 40. The finger guard 40 is formed by a type of disk-shaped partition wall 41, as FIGS. 3 to 6 show. The partition wall plane 42 is preferably located in such a manner that the handle longitudinal axis 33 stands perpendicular on the partition wall plane 42. The partition wall 41 protrudes by a protrusion z with respect to the longitudinal sides 38 and 39 of the cutting apparatus 1. The partition wall 41 protects the user's hand gripping around the handle 6 with respect to the cutter unit 3.

The partition wall 41 of the finger guard 40, together with the handle longitudinal axis 33, delimits a finger angle 44 of approximately 80° to 110°, which opens to the rear end 9 of the handle 6. In the embodiment shown, the finger angle is 90°.

An apparatus angle 46 lying between the motor housing longitudinal axis 23 and the cutter unit longitudinal axis 13 is greater than 90°. In particular, the angle is 150°.

The arrangement of the handle 6, motor housing 4 and cutter unit 3 around the central housing section 2 is provided in particular in such a manner that the sum total of directional angle 26 and apparatus angle 46 is greater than 180°, in particular has a magnitude of 205°.

Figure 3:
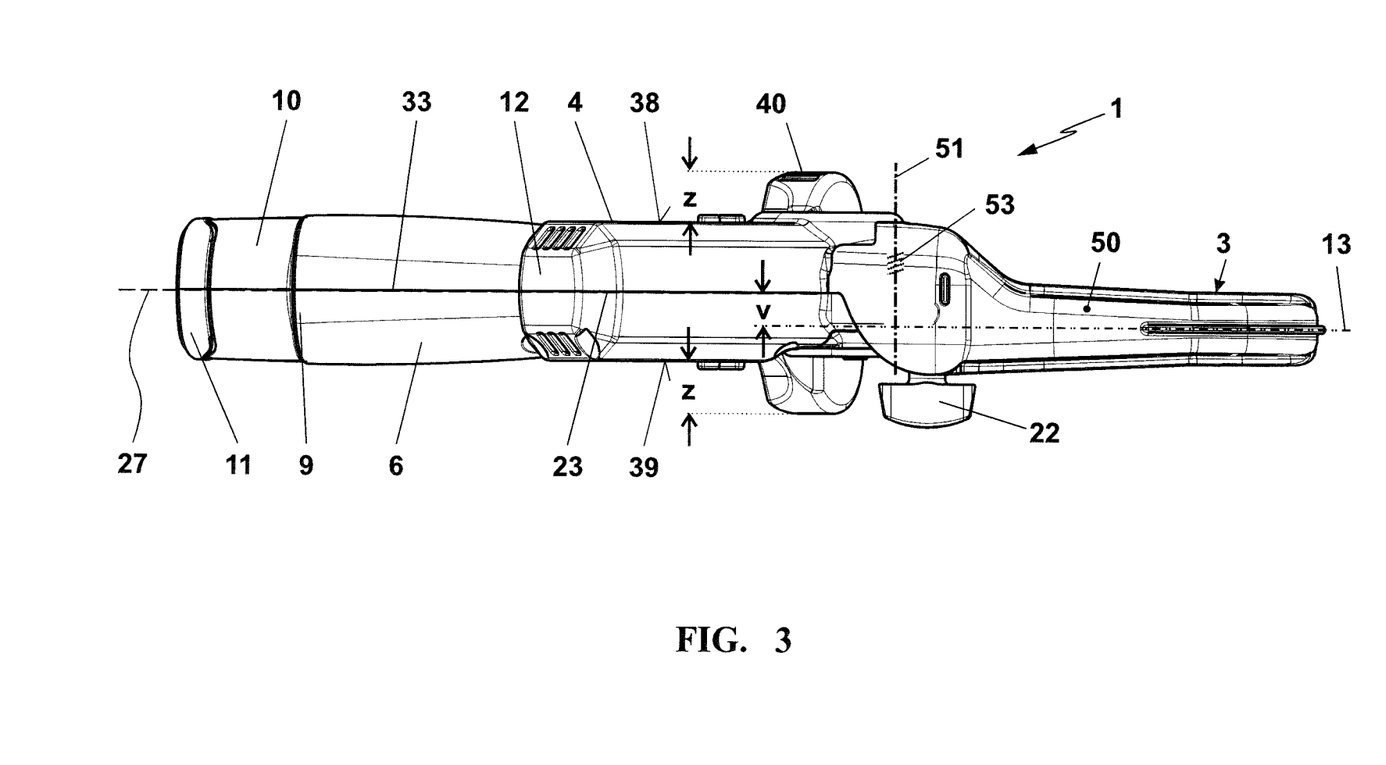
FIG. 3 shows a plan view onto the cutting apparatus shown in FIG. 2.

As can be seen from the plan view according to FIG. 3, the handle longitudinal axis 33 and the motor housing longitudinal axis 23 lie in a common plane 27. In the plan view according to FIG. 3, the cutter unit longitudinal axis 13 lies with a lateral offset v to the plane 27. The cutter unit longitudinal axis 13 preferably runs parallel to the plane 27.

The cutter unit 3 is covered by a protection cover 50, which—cf. FIG. 3—can be pivoted about a cap pivot axis 51. To this end, the protection cover 50 is mounted pivotably on the central housing section 2. The pivot bearing is provided on the central housing section 2 between the cutter unit 3 and the motor housing 4.

If the cutter unit 3 is lowered in the movement arrow direction 48 onto a workpiece 49 to be cut, the protection cover 50 pivots upward in the direction of arrow 52 about the cap pivot axis 51, such that the saw chain 20 circulating on the guide bar 19 comes into cutting engagement with the workpiece 49.

If the cutting apparatus 3 is raised counter to the movement arrow direction 48, the protection cover pivots back counter to the direction of arrow 52 under the action of a return spring 53, such that the guide bar 19, together with the saw chain 20, is covered by the protection cover 50 again.

FIGS. 4 and 5 show in particular the drive connection 15. The electric motor 5 drives the drive pinion 31, which meshes with the driving wheel 17. The driving wheel 17 is held fixedly in terms of rotation on the drive shaft 29. The drive shaft 29 is held rotatably in the central housing section 2 with two bearings 32. The sprocket wheel 18 is mounted on a free end 35 of the drive shaft 29 and drives the saw chain 20 circulating on the guide bar 19.

Figure 6:
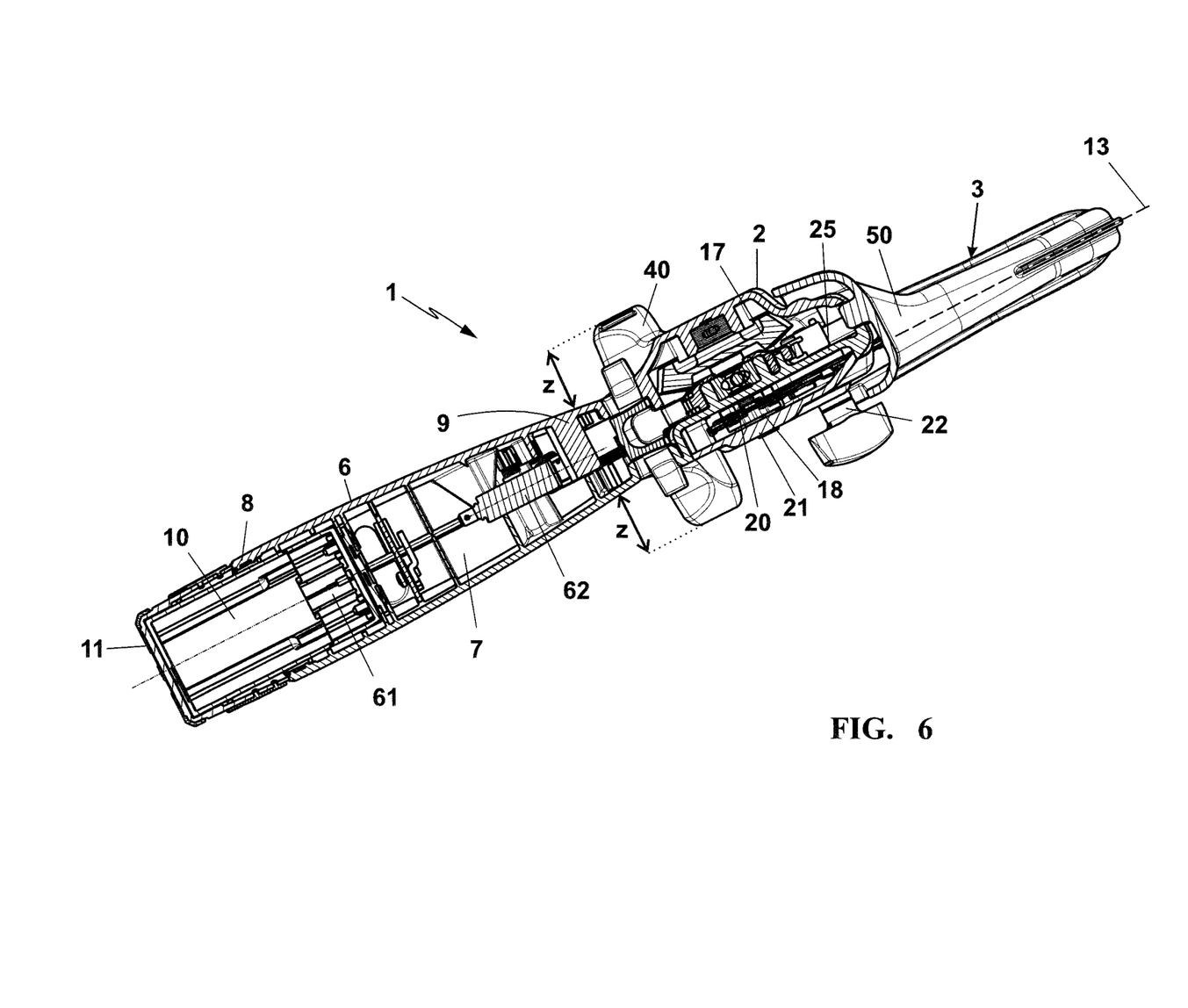

It is clear from the sectional illustration according to FIG. 6 that the battery pack 10 is pushed at least with one end 61 into the handle housing 7 of the handle 6. Within the handle housing 7, the battery pack 10 is connected to the drive electronics of the electric drive motor 5 and to an actuating element, in the form of a throttle lever 62, for controlling the electric drive motor 5.

It is understood that the foregoing description is that of the preferred embodiments of the invention and that various changes and modifications may be made thereto without departing from the spirit and scope of the invention as defined in the appended claims.

What is claimed is:

1. A handheld, portable cutting apparatus comprising:
a cutter unit;
a central housing section;
said cutter unit adjoining said central housing section;
a motor housing;
an electric drive motor disposed in said motor housing;
a drive connection arranged in said central housing section between said electric drive motor and said cutter unit;
said drive connection having a driving wheel configured to rotate about a rotational axis;
said cutter unit defining a longitudinal cutter unit axis extending radially with respect to said rotational axis when viewed in a side elevation view onto the cutting apparatus;
said motor housing extending from said central housing section and defining a longitudinal motor housing axis extending radially with respect to said rotational axis when viewed in said side elevation view onto the cutting apparatus;
a handle for guiding the handheld, portable cutting apparatus during operation, said handle being non-rotatable with respect to said central housing section and extending from said central housing section and defining a longitudinal handle axis extending radially with respect to said rotational axis when viewed in said side elevation view onto the cutting apparatus and a longitudinal handle direction;
said handle having a front end adjoining said central housing section and a rear end;
wherein said rear end of said handle has an open form, such that a battery pack can be pushed into said rear end in an insertion direction along an insertion axis, wherein said insertion axis extends through said handle housing and through said central housing section;
said longitudinal cutter unit axis extending clear of the battery pack when viewed in said side elevation view onto the cutting apparatus;
said longitudinal handle axis extending from said rotational axis to said rear end;
said handheld, portable cutting apparatus being clear of a handle movable relative to said central housing section;
said cutter unit including a guide bar and a saw chain configured to circulate on said guide bar; said drive motor being configured to drive said saw chain via said drive connection;
said guide bar having a longitudinal end facing away from said rotational axis; and said longitudinal cutter unit axis extending from said rotational axis up to said longitudinal end of said guide bar.

2. The handheld, portable cutting apparatus of claim 1, wherein:
said cutter unit extends in a radial direction R1 from said central housing section;
said motor housing extends in a radial direction R2 from said central housing section;
said handle extends in a radial direction R3 from said central housing section.

3. The handheld, portable cutting apparatus of claim 1, wherein said cutter unit, said motor housing and said handle extend radially with respect to said rotational axis when viewed in said side elevation view onto the cutting apparatus.

4. The handheld, portable cutting apparatus of claim 1, wherein said driving wheel, in a two-dimensional rendering of said side elevation view directed towards said rotational axis, defines a contour; the handheld, portable cutting apparatus further comprising:
a sprocket wheel arranged such that said sprocket wheel, in said two-dimensional rendering, lies within said contour of said driving wheel; and
a sprocket wheel cover configured to cover said sprocket wheel.

5. The handheld, portable cutting apparatus of claim 4, wherein said sprocket wheel cover is part of said central housing section.

6. The handheld, portable cutting apparatus of claim 1, wherein:

said longitudinal handle axis and said longitudinal motor housing axis conjointly enclose a hand angle open toward said rear end of said handle lying in a range of 40° to 80°; and, said hand angle is configured so as to cause said motor housing and said handle to delimit a protected receptacle for a user's hand.

7. The handheld, portable cutting apparatus of claim 1, wherein said longitudinal handle axis and said longitudinal motor housing axis conjointly define a hand angle of 60°.

8. The handheld, portable cutting apparatus of claim 1, wherein:
said longitudinal handle axis and said longitudinal cutter unit axis conjointly define a handle angle; and,
said handle angle is greater than 90°.

9. The handheld, portable cutting apparatus of claim 8, wherein said handle angle is 150°.

10. The handheld, portable cutting apparatus of claim 8 further comprising:
a finger guard; and,
said handle angle being subdivided by said finger guard.

11. The handheld, portable cutting apparatus of claim 10, wherein:
said finger guard and said longitudinal handle axis conjointly define a finger angle open toward said rear end of said handle; and,
said finger angle lies in a range from 80° to 110°.

12. The handheld, portable cutting apparatus of claim 11, wherein said finger angle is 90°.

13. The handheld, portable cutting apparatus of claim 1, wherein said longitudinal motor housing axis and said longitudinal cutter unit axis conjointly define an apparatus angle of greater than 90°.

14. The handheld, portable cutting apparatus of claim 13, wherein:
said longitudinal handle axis and said longitudinal motor housing axis conjointly define a hand angle; and,
a sum of said hand angle and said apparatus angle is greater than 180°.

15. The handheld, portable cutting apparatus of claim 13, wherein said apparatus angle is 150°.

16. A handheld, portable cutting apparatus comprising:
a cutter unit;
a central housing section;
said cutter unit adjoining said central housing section;
a motor housing;
an electric drive motor disposed in said motor housing;
a drive connection arranged in said central housing section between said electric drive motor and said cutter unit;
said drive connection having a driving wheel configured to rotate about a rotational axis;
said motor housing extending from said central housing section and defining a longitudinal motor housing axis;
a handle extending from said central housing section;
an actuating element configured to control said electric drive motor, wherein said actuating element is configured to be actuated by a hand of an operator gripping said handle;
said handle having a front end adjoining said central housing section and a rear end;
wherein said rear end of said handle has an open form, such that a battery pack can be pushed into said rear end in an insertion direction along an insertion axis, wherein said insertion axis extends through said handle housing and through said central housing section;
said longitudinal cutter unit axis extending clear of the battery pack when viewed in a side elevation view onto the cutting apparatus;
said handle defining a longitudinal handle axis extending from said front end to said rear end;
said longitudinal handle axis defining a longitudinal handle direction;
said handheld, portable cutting apparatus being clear of a handle movable relative to said central housing section;
said cutter unit including a guide bar and a saw chain configured to circulate on said guide bar;
said drive motor being configured to drive said saw chain via said drive connection;
said guide bar defining a longitudinal center axis;
said cutter unit extending along a longitudinal cutter unit axis;
wherein said longitudinal cutter unit axis runs coaxially to said longitudinal center axis;
said longitudinal handle axis and said longitudinal motor housing axis defining, at least in a two-dimensional rendering of said side elevation view directed towards said rotational axis, a first point of intersection P1;
said longitudinal handle axis and said longitudinal cutter unit axis defining, at least in said two-dimensional rendering of said side elevation view a second point of intersection P2, wherein said longitudinal handle axis, said longitudinal motor housing axis, and said longitudinal cutter unit axis run parallel to an imaginary plane which is perpendicular to said rotational axis; and
said first point of intersection PI and said second point of intersection P2 both lying in said central housing section in said two-dimensional rendering of said side elevation view.

17. The handheld, portable cutting apparatus of claim 16, wherein said handle is defined by a handle housing having said front end and said rear end; and, all of said handle housing is configured to have a form of a single rod from said front end to said rear end.

18. The handheld, portable cutting apparatus of claim 16, wherein said handle is defined by a handle housing and, in a peripheral direction about said rotational axis, said motor housing is arranged between said cutter unit and said handle housing and capable of being directed upwardly during operational use of said handheld, portable cutting apparatus.

19. The handheld, portable cutting apparatus of claim 16, wherein said handle is defined by a handle housing and said handle housing defines a point at a maximum handle distance to said rotational axis; said motor housing defines a point at a maximum motor distance to said rotational axis; said drive motor defines a motor longitudinal axis and said maximum motor distance is measured in the direction of said motor longitudinal axis; said motor longitudinal axis runs parallel to said imaginary plane which is perpendicular to said rotational axis; and said maximum handle distance is greater than said maximum motor distance.

20. A handheld, portable cutting apparatus comprising:
a cutter unit;
a central housing section;
said cutter unit adjoining said central housing section;
a motor housing;
an electric drive motor disposed in said motor housing;
a drive connection arranged in said central housing section between said electric drive motor and said cutter unit;
said drive connection having a driving wheel configured to rotate about a rotational axis;

said motor housing extending from said central housing section and defining a longitudinal motor housing axis;
a handle extending from said central housing section;
an actuating element configured to control said electric drive motor, wherein said actuating element is configured to be actuated by a hand of an operator gripping said handle;
said handle having a front end adjoining said central housing section and a rear end;
wherein said rear end of said handle has an open form, such that a battery pack can be pushed into said rear end in an insertion direction along an insertion axis, wherein said insertion axis extends through said handle housing and through said central housing section;
said longitudinal cutter unit axis extending clear of the battery pack when viewed in a side elevation view onto the cutting apparatus;
said handle defining a longitudinal handle axis extending from said front end to said rear end;
said longitudinal handle axis defining a longitudinal handle direction; said handheld, portable cutting apparatus being clear of a handle movable relative to said central housing section;
said cutter unit including a guide bar and a saw chain configured to circulate on said guide bar; said drive motor being configured to drive said saw chain via said drive connection;
said guide bar defining a longitudinal center axis;
said cutter unit extending along a longitudinal cutter unit axis;
wherein said longitudinal cutter unit axis runs coaxially to said longitudinal center axis;
said longitudinal handle axis and said longitudinal motor housing axis defining, at least in a two-dimensional rendering of said side elevation view directed towards said rotational axis, a first point of intersection P1;
said longitudinal handle axis and said longitudinal cutter unit axis defining, at least in said two-dimensional rendering of said side elevation view a second point of intersection P2, wherein said longitudinal handle axis, said longitudinal motor housing axis, and said longitudinal cutter unit axis run parallel to an imaginary plane which is perpendicular to said rotational axis;
said first point of intersection P1 and said second point of intersection P2 both lying in said central housing section in said two-dimensional rendering of said side elevation view;
said handle being defined by a handle housing having said front end and said rear end; and, all of said handle housing is configured to have a form of a single rod from said front end to said rear end;
in a peripheral direction about said rotational axis, said motor housing being arranged between said cutter unit and said handle housing and capable of being directed upwardly during operational use of said handheld, portable cutting apparatus;
said handle housing defining a point at a maximum handle distance to said rotational axis;
said motor housing defining a point at a maximum motor distance to said rotational axis;
said cutter unit defining a point at a maximum cutter distance to said rotational axis;
said drive motor defining a motor longitudinal axis and said maximum motor distance is measured in the direction of said motor longitudinal axis; said motor longitudinal axis runs parallel to said imaginary plane which is perpendicular to said rotational axis;
said maximum handle distance being greater than said maximum motor distance; and
said maximum handle distance being greater than said maximum cutter distance.

* * * * *

UNITED STATES PATENT AND TRADEMARK OFFICE
CERTIFICATE OF CORRECTION

| | |
|---|---|
| PATENT NO. | : 11,389,884 B2 |
| APPLICATION NO. | : 15/812419 |
| DATED | : July 19, 2022 |
| INVENTOR(S) | : Mang et al. |

Page 1 of 1

It is certified that error appears in the above-identified patent and that said Letters Patent is hereby corrected as shown below:

In the Claims

In Column 8:
Line 31: delete "PI" and insert -- P1 -- therefor.

Signed and Sealed this
Fourth Day of October, 2022

Katherine Kelly Vidal
*Director of the United States Patent and Trademark Office*